(12) United States Patent
Lombardo et al.

(10) Patent No.: US 8,489,267 B1
(45) Date of Patent: Jul. 16, 2013

(54) METHOD AND SYSTEM FOR ADAPTING ENGINE COOLANT TEMPERATURE (ECT) WARM-UP TRAJECTORY BASED ON HEATER CORE LOADING TO ADJUST CABIN TEMPERATURE

(75) Inventors: Paul S. Lombardo, Commerce Township, MI (US); Allen J. Lehmen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/600,059

(22) Filed: Aug. 30, 2012

(51) Int. Cl.
*G06F 17/00* (2006.01)

(52) U.S. Cl.
USPC ............ 701/22; 62/173; 62/179; 62/196.4; 62/228.3; 62/228.4; 701/102; 701/105; 701/113; 123/41.15; 123/41.31; 123/435; 123/436; 123/299

(58) Field of Classification Search
USPC ............ 701/22, 102, 105, 109, 113; 62/173, 62/179, 196.4, 228.1, 228.3, 228.4, 230, 62/511; 123/41.15, 41.31, 436, 299, 435, 123/491, 689
See application file for complete search history.

(56) References Cited

U.S. PATENT DOCUMENTS

| | | | | |
|---|---|---|---|---|
| 6,073,457 A | * | 6/2000 | Kampf et al. | 62/179 |
| 6,467,291 B1 | * | 10/2002 | Takano et al. | 62/228.3 |
| 6,622,500 B1 | * | 9/2003 | Archibald et al. | 62/173 |
| 6,892,550 B2 | * | 5/2005 | Takemoto et al. | 62/229 |
| 7,080,522 B2 | * | 7/2006 | Taira | 62/244 |
| 7,398,653 B2 | * | 7/2008 | Oomura et al. | 62/228.4 |

* cited by examiner

*Primary Examiner* — McDieunel Marc
(74) *Attorney, Agent, or Firm* — Ingrassia Fisher & Lorenz, P.C.

(57) ABSTRACT

In a hybrid-electric vehicle that includes a cabin, methods and systems are provided for modifying a first curve for engine coolant temperature (ECT) warm-up trajectory. The system includes a processor configured to execute software instructions, and a memory configured to store software instructions accessible by the processor. In one embodiment, the software instructions comprise an offset lookup table that is configured to generate, based on a calculated thermal power loss across a heater core and an ambient air temperature, an offset value for modifying the first curve for ECT warm-up trajectory to produce a desired curve for ECT warm-up trajectory that is offset from the first curve. The desired curve for ECT warm up trajectory is used to adjust temperature in the cabin so that fuel consumption can be reduced.

30 Claims, 5 Drawing Sheets

METHOD AND SYSTEM FOR ADAPTING ENGINE COOLANT TEMPERATURE (ECT) WARM-UP TRAJECTORY BASED ON HEATER CORE LOADING TO ADJUST CABIN TEMPERATURE

TECHNICAL FIELD

The technical field generally relates to hybrid electric vehicles (HEVs) and more particularly relates to controlling operation of an internal combustion engine used in a HEV.

BACKGROUND

The statements in this section merely provide background information related to the present disclosure. Accordingly, such statements are not intended to constitute an admission of prior art.

Vehicle systems include powertrain systems that provide tractive torque for propulsion. Powertrain systems may include hybrid electric systems, all-electric systems, and extended-range electric systems that may be configured to operate in various operating modes to generate and transfer torque to a driveline. Such powertrain systems use torque-generative devices, clutches and transmissions. Torque-generative devices include internal combustion engines and electrically-powered machines (often referred to as electric motors or generators).

Known powertrain systems employ control schemes to minimize fuel consumption in an internal combustion engine while responding to operator torque requests for tractive power.

Consumed fuel generates power and heat, which may be used elsewhere in the powertrain system and vehicle, such as in a vehicle cabin compartment. Known vehicle systems include that make use of the power and/or heat can include, but are not limited to, operator-controllable heating, ventilating, and air conditioning (HVAC) systems. These systems can include a controllable electric-powered cabin heater, a controllable electric-powered windshield defogger, a controllable electric-powered rear window defogger, etc. Modern automotive HVAC systems have many sensors and control actuators can have, for example, a temperature sensor inside the cabin, one measuring ambient temperature outside and others measuring various temperatures of the system internal workings. The occupant may have some input to the system via a set point or other adjustment. Additional sensors measuring sun heating load, humidity, etc. might be available to the system. The set of actuators might include a variable speed blower, some means for varying air temperature, ducting and doors to control the direction of air flow and the ratio of fresh to recirculated air.

Under certain operating conditions, a powertrain system of a hybrid electric vehicle (HEV) may operate only to minimize fuel consumption may not operate an internal combustion engine in a manner that generates heat to meet thermal demands and requirements, for example for cabin comfort and window defrosting/defogging. When a HEV operates with its internal combustion engine off, this is sometimes referred to in the art as "engine off operating mode." As such, the waste heat from the internal combustion engine that is typically used to heat the cabin of the vehicle (e.g., when operating colder ambient temperatures) has become more difficult to obtain when a HEV is operating in this engine off operating mode.

Techniques have been developed for controlling a hybrid powertrain system that includes an internal combustion engine. To provide adequate heat to the cabin, heater performance control software can be used to control engine coolant temperature. For example, when the HEV is operating in cold ambient temperatures, the heater performance control logic forces the internal combustion engine on (in situations where the internal combustion engine would normally be off) so that adequate heat can be provided to a heater core to produce vent discharge temperatures into the cabin that are desired to sustain cabin comfort.

According to one approach, operation of the hybrid powertrain system can be controlled in response to a preferred minimum coolant temperature warm-up trajectory for the internal combustion engine.

For example, in accordance with one conventional technique, during warm-up, the engine is controlled such that the engine coolant temperature follows a minimum warm-up trajectory (also referred to herein as a preferred minimum coolant temperature warm-up trajectory or simply as an "engine coolant temperature (ECT) warm-up trajectory"). The outside (or ambient) air temperature, vehicle runtime, vehicle soak time and vehicle run time are used as indicators of temperature of the vehicle interior cabin compartment of a subject vehicle, and are used to select a preferred minimum coolant temperature warm-up trajectory. Interpolation schemes can be implemented to determine a preferred minimum coolant temperature warm-up trajectory for outside air temperatures that lie between the outside air temperatures of 20° C., 10° C., 0° C., −10° C. and −20° C.

A closed-loop control of the hybrid powertrain system is executed in response to the preferred minimum coolant temperature warm-up trajectory. The closed-loop control includes directly monitoring the coolant temperature, preferably using a coolant temperature sensor. A difference between the coolant temperature and a preferred minimum coolant temperature corresponding to vehicle runtime is determined by employing the preferred minimum coolant temperature warm-up trajectory. If the preferred minimum coolant temperature warm-up trajectory is not following the desired curve, the internal combustion engine is forced on so that engine heat increases to track the preferred minimum coolant temperature warm-up trajectory.

The preferred minimum coolant temperature warm-up trajectory is designed to meet worst case cabin performance specifications, and takes into account only the ambient air temperature outside the vehicle and run time. During low load situations, such as at low blower speeds, this can result in vent discharge temperatures that are greater than desired. One drawback of this approach is that it results in increased fuel consumption for other drive cycles with a lower cabin heat loads.

There are a variety of reasons that it is desirable to decrease fuel consumption whenever possible. Furthermore, other desirable features and characteristics of the present invention will become apparent from the subsequent detailed description and the appended claims, taken in conjunction with the accompanying drawings and the foregoing technical field and background.

SUMMARY

In one embodiment, in a hybrid-electric vehicle that includes a cabin, a system is provided for modifying a first curve for engine coolant temperature (ECT) warm-up trajectory to produce a desired curve for ECT warm-up trajectory that is offset from the first curve. The system includes a processor configured to execute software instructions, and a memory configured to store software instructions accessible by the processor. In one embodiment, the software instructions comprise an offset lookup table. The offset lookup table is configured to generate, based on a calculated thermal power loss across a heater core (e.g., that represents heat rejection through the heater core) and an ambient air temperature, an offset value for modifying the first curve for ECT warm-up trajectory to produce the desired curve for ECT warm-up trajectory that is offset from the first curve.

In another embodiment, a processor-readable storage medium is provided having processor-readable code embodied thereon for programming at least one processor to perform a method for modifying a first curve for engine coolant temperature (ECT) warm-up trajectory. The method includes generating, based on a calculated thermal power loss across a heater core and an ambient air temperature, an offset value for modifying the first curve for ECT warm-up trajectory to produce a desired curve for ECT warm-up trajectory that is offset from the first curve. The desired curve for ECT warm up trajectory is used to adjust temperature in a cabin of a hybrid-electric vehicle so that fuel consumption can be reduced.

In one particular implementation of an embodiment, in a hybrid-electric vehicle that includes a cabin, a system is provided for modifying a first curve for engine coolant temperature (ECT) warm-up trajectory to produce a desired curve for ECT warm-up trajectory that is offset from the first curve. The system includes a processor configured to execute software instructions, and a memory configured to store software instructions accessible by the processor. The software instructions can include a set of software instructions stored in the memory to: determine a value of a first fluid flow rate that corresponds to an engine coolant fluid temperature and an engine speed input value; determine a value of a second fluid flow rate that corresponds to the engine coolant fluid temperature and a pump speed input value; generate, based on at least one value of the first fluid flow rate and the second fluid flow rate, a value of fluid flow rate of engine coolant fluid through the heater core; generate, based on the engine coolant fluid temperature, a value of fluid viscosity of the engine coolant fluid; compute a temperature difference between an output temperature of the heater core and an input temperature of the heater core; generate, based on the value of fluid flow rate through the heater core, the value of fluid viscosity, and the temperature difference, a calculated thermal power loss across a heater core; and generate, based on the calculated thermal power loss and an ambient air temperature, an offset value for modifying the first curve for ECT warm-up trajectory to produce the desired curve for ECT warm-up trajectory that is offset from the first curve. The desired curve for ECT warm up trajectory is used to adjust temperature in the cabin so that fuel consumption can be reduced.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Current approaches for determining engine coolant temperature (ECT) warm-up trajectory only take into account engine coolant temperature, ambient temperature, vehicle soak time and vehicle run time. The inventors observed that using these as the only inputs for adjusting ECT warm-up trajectory can result in considerably more "engine on time," which results in higher fuel consumption especially during cold ambient temperature conditions.

The inventors observed that low blower speeds correlate to lower heater core demand, and that it would be desirable to use variables that provide feedback regarding the heater core loading, such as the heater core output temperature, power loss across the heater core, etc. to control ECT warm-up trajectory. These variables can provide a better correlation between engine coolant temperature and cabin discharge temperature.

In accordance with the disclosed embodiments, thermal power loss across a heater core can be calculated. Based on the calculated thermal power loss and ambient air temperature, an offset value can be generated for modifying a first curve for ECT warm-up trajectory to produce a desired curve for ECT warm-up trajectory that is offset from the first curve. In some embodiments, heater core input and output temperatures can be monitored to determine power loss across the heater core. This information serves as an estimate of blower speed, and can be used to calibrate the ECT warm-up trajectory while maintaining desired cabin air discharge temperature. Using such variables to adjust ECT warm-up trajectory (so that it follows a desired curve) can help reduce engine on/off cycling since this allows engine off times to be lengthened, which can in turn reduce fuel consumption.

Before describing some of the various embodiments in detail, it should be observed that the embodiments reside primarily in combinations of method steps and apparatus components related to modifying a first curve for engine coolant temperature (ECT) warm-up trajectory to produce a desired curve for ECT warm-up trajectory that is offset from the first curve. It will be appreciated that embodiments described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" can generally refer to a device, a circuit, an electrical component, and/or a software based component for performing a task. Depending on the context, a module can also refer to a group of hardware or software based components. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments described herein may be comprised of one or more conventional processors and unique stored program instructions that control the one or more processors to implement, in conjunction with certain non-processor circuits, some, most, or all of the functions for modifying a first curve for engine coolant temperature (ECT) warm-up trajectory to produce a desired curve for ECT warm-up trajectory that is offset from the first curve, as described herein. As such, these functions may be interpreted as steps of a method for modifying a first curve for engine coolant temperature (ECT) warm-up trajectory to produce a desired curve for ECT warm-up trajectory that is offset from the first curve. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
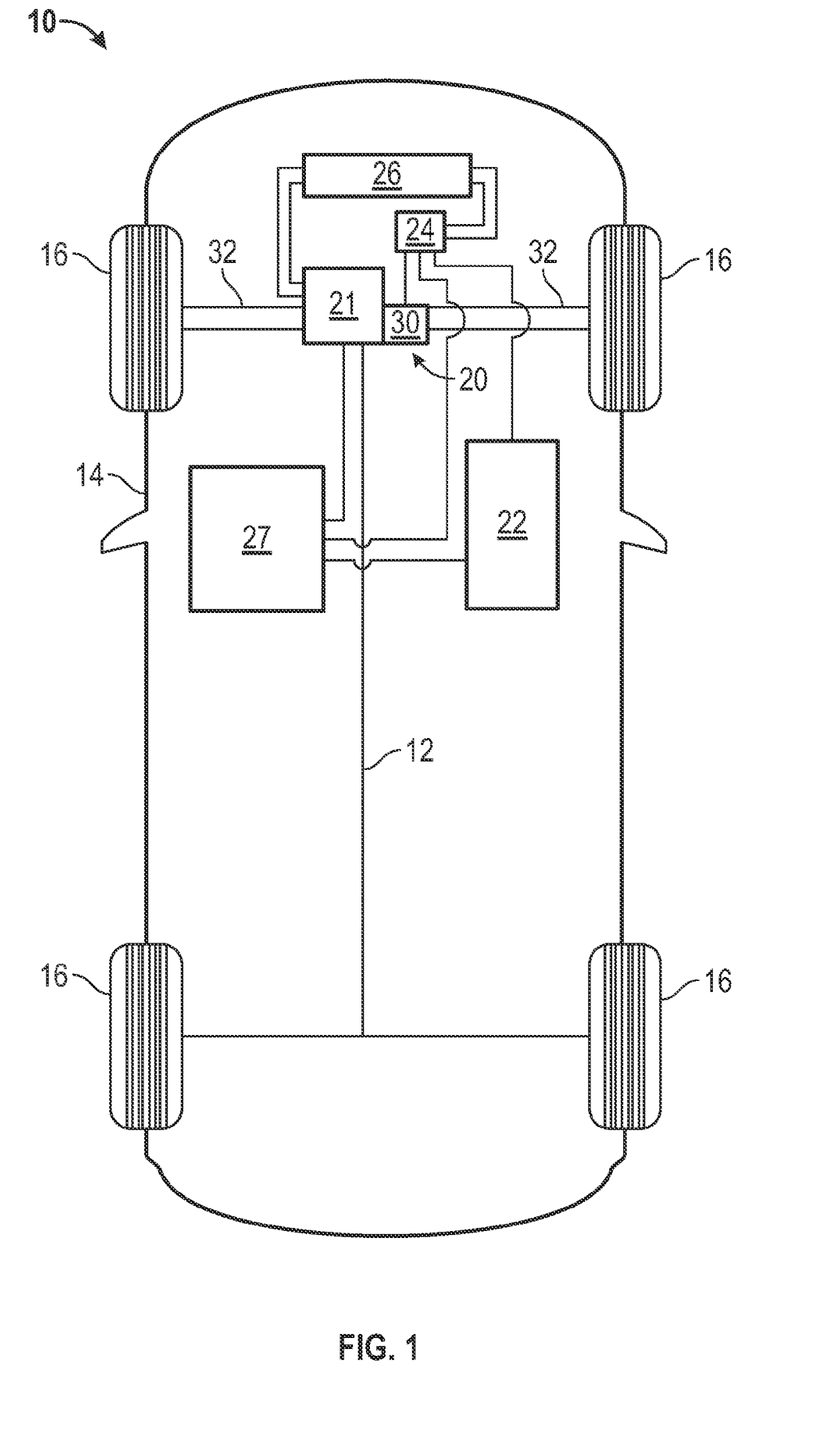
FIG. 1 illustrates simplified block diagram of a vehicle in which the disclosed embodiments can be implemented in accordance with one exemplary implementation.

FIG. 1 illustrates a simplified block diagram of a vehicle 10 in which the disclosed embodiments can be implemented in accordance with one exemplary implementation.

Preliminary, it is noted that the vehicle 10 includes a chassis 12, a body 14, wheels 16, and a controller 27. The vehicle 10 also includes an interior cabin compartment (not illustrated in FIG. 1) for seating. The body 14 is arranged on the chassis 12 and substantially encloses the other components of the vehicle 10 including the interior cabin compartment (not illustrated in FIG. 1). The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, an electric machine, or a hybrid engine. As used herein, a hybrid electric vehicle drive system refers to a drive system that includes an internal combustion engine in combination with one or more electric machines (i.e., such as in a hybrid electric vehicle (HEV)).

When the vehicle 10 is a hybrid electric vehicle (HEV), it can be either a series-hybrid electric vehicle (SHEV), a parallel-hybrid electric vehicle (PHEV), and a compound-hybrid electric vehicle (CHEV) (also referred to in the art as a parallel/series hybrid electric vehicle (PSHEV)).

In the description that follows, it will be assumed that the vehicle 10 is an HEV, and therefore will be referred to as HEV 10.

As such, in FIG. 1, the internal combustion engine 21 and/or the electric machine 30 are integrated such that one or both are mechanically coupled to at least some of the wheels 16 through one or more drive shaft(s) 32. The HEV 10 is a "series HEV" when the combustion engine 21 is not directly coupled to the transmission, but coupled to a generator (not shown), which is used to power the electric machine 30. By contrast, the HEV 10 is a "parallel HEV," when the internal combustion engine 21 is directly coupled to the transmission by, for example, having the rotor of the electric machine 30 rotationally coupled to the drive shaft of the combustion engine 21.

In the exemplary embodiment illustrated in FIG. 1, the HEV 10 further includes an actuator assembly 20, a battery (or a high voltage direct current (DC) power supply) 22, a power converter assembly 24 (also referred to herein as an inverter, an inverter module or inverter assembly), and a radiator 26. The actuator assembly 20 includes an internal combustion engine 21 and an electric machine 30 (also referred to herein as an electric motor or generator).

The internal combustion engine 21 is any internal combustion engine (ICE) that converts fuel to mechanical power through a combustion process. The ICE 21 may consume gasoline, diesel, or other combustible fuel to power the ICE 21. The ICE 21 is considered to be in an engine on operating mode when it is being fueled, and is considered to be in an engine off operating mode when it is not being fueled. In generating power during operation of the HEV 10, the ICE 21 generates heat. Being an energy generation unit that generates heat for use in the HEV 10, the ICE 21 can be started (or placed in an engine on operating mode) to generate heat within a cabin compartment of the HEV 10 as needed. As will be described below, the ICE 21 is equipped with a plurality of sensing devices and actuators configured to monitor operation (e.g., temperatures or speeds) and deliver fuel to form a combustion charge to generate torque.

The electric machine 30 can be any alternating current machine for powering a vehicle. As used herein, the term "alternating current (AC) machine" generally refers to a device or apparatus that converts electrical energy to mechanical energy or vice versa. AC machines can generally be classified into synchronous AC machines and asynchronous AC machines. Synchronous AC machines can include permanent magnet machines (e.g., surface mount permanent magnet machines (SMPMMs) and interior permanent magnet machines (IPMMs)) and reluctance machines. By contrast, asynchronous AC machines include induction machines.

The electric machine 30 can be used as either an electric motor (e.g., apparatus used to convert electrical energy power at its input to produce to mechanical energy or power), or as a generator that converts mechanical energy or power into electrical energy or power at its output. When operating as an electric motor, the electric machine 30 outputs torque to a drive shaft that is connected to a gear set. When operating as a machine that converts mechanical energy into electric energy, the electric machine 30 outputs high-voltage electric power as is known in the art.

Although the electric machine 30 is illustrated as a single box, it is noted that in some embodiments, the HEV 10 can include first and second electric machines (not illustrated). These electric machines can be any non-combustion torque-generating machines, and preferably include multi-phase electric machines electrically connected to the inverter module 24 that are configured to convert stored electric energy to mechanical power and convert mechanical power to electric energy that may be stored in the energy storage device 22 (e.g., battery), which is described below. The first and second electric machines (not illustrated) have limitations in power outputs in the form of torque and rotational speeds.

When the HEV 10 includes first and second electric machines (not illustrated), the inverter module 24 will typically include first and second electric power inverters (not illustrated) that electrically connect to the first and second electric machines, respectively. The first and second electric machines (not illustrated) interact with the respective first and second electric power inverters (not illustrated) to convert stored electric energy provided from the energy storage device 22 to mechanical power and convert mechanical power to electric energy that may be stored in the energy storage device 22. When first and second electric machines are implemented, the first and second electric power inverters (not illustrated) are operative to transform high voltage DC electric power to high-voltage AC electric power and also operative to transform high voltage AC electric power to high-voltage DC electric power.

In one arrangement, electric power originating in the first electric machine may be transferred electrically to the energy storage device 22 via the inverter module 24 and the high-voltage bus (not illustrated) and to the second torque machine (not illustrated) via the inverter module 24.

The energy storage device 22 may be any energy storage device (e.g., a high-voltage battery) including any of those that are described herein. One exemplary energy storage device 22 is a high-voltage battery, fabricated from a plurality of lithium-ion cells, that outputs and stores high-voltage electric power. It is appreciated that the energy storage device 22 may include a plurality of electrical cells, ultracapacitors, and other electrochemical devices configured to store energy and provide electric energy on-vehicle. When the energy storage device 22 is a high-voltage battery, it is electrically connected via a high-voltage bus to the inverter module 24 that connects to electric machine 30 to transfer electric power therebetween. In one implementation, the ESD 22 can include a controller (not illustrated), such as a battery control module (BCM), to control electric power to and from the ESD 22. The BCM may determine a state of charge (SOC) of the ESD 22 to determine when the ESD 22 needs to be charged. In addition, the BCM can control charging of the ESD 22 as well as how the ESD 22 provides power before starting the ICE 21. An external connector (not illustrated) can be used to electrically connect to the energy storage device 22 and is connectable to an external AC power source to provide electric power for charging the high-voltage ESD 22.

The radiator 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 21 and the inverter 24. In some embodiments, the inverter 24 can receive and share coolant with the electric machine 30; however, in other embodiments separate coolants may be used for the inverter 24 and the electric machine 30. The radiator 26 may be similarly connected to the inverter 24 and/or the electric machine 30.

Various details regarding operation of the controller 27 will be described below. Although the controller 27 is illustrated as a single, unitary element for ease of depiction, in many cases, the controller 27 has a distributed architecture including a plurality of control module devices that are implemented using separate processors. The functions described as being performed by the controller 27 may be combined into one or more devices, e.g., implemented in software, hardware, and/or application-specific integrated circuitry (ASIC) and ancillary circuits that are separate and distinct from the controller 27. For instance, although not shown in detail in FIG. 1, the controller 27 can include various automotive control modules, or electronic control units (ECUs), such as an inverter control module and a vehicle controller, a climate control system including a climate control module, and at least one processor and/or a memory which includes instructions stored thereon (or in another computer-readable medium) for carrying out the processes and methods as described below for controlling the operation of the ICE 21, the machine 30 and other components and modules of the HEV 10. Examples of some of the above-mentioned will be described below with reference to FIG. 2.

In addition, in the embodiment illustrated in FIG. 1, the controller 27 is illustrated as being in communication with the actuator assembly 20, the high voltage ESD 22, and the inverter module 24 (also referred to as an inverter or and inverter assembly); however, it is also in communication with other components that are not illustrated in FIG. 1. The controller 27 may also obtain, for example, information regarding the speed of the ICE 21, temperature settings from a climate control module (not illustrated)), an amount of time that has lapsed since a last run of the ICE 21, how long the ICE 21 operated during its last run, an ambient temperature outside the HEV 10 as well as various information from memory 280 outside the controller 27, such as predetermined coolant temperatures, levels of power consumed by the HEV 10, speeds of the HEV 10, and distances traveled by the HEV 10.

In addition, the controller 27 is communicatively coupled to sensing devices or "sensors" (illustrated in FIG. 2), the engine 21, and other vehicle components including the energy storage device 22, the inverter module 24, the electric machine 30, and other components that are not illustrated (e.g., transmission). The controller 27 operatively connects to sensors either directly or via a communications bus (not illustrated). Some of the sensors that can be implemented in conjunction with the disclosed embodiments will now be described below.

Figure 2:
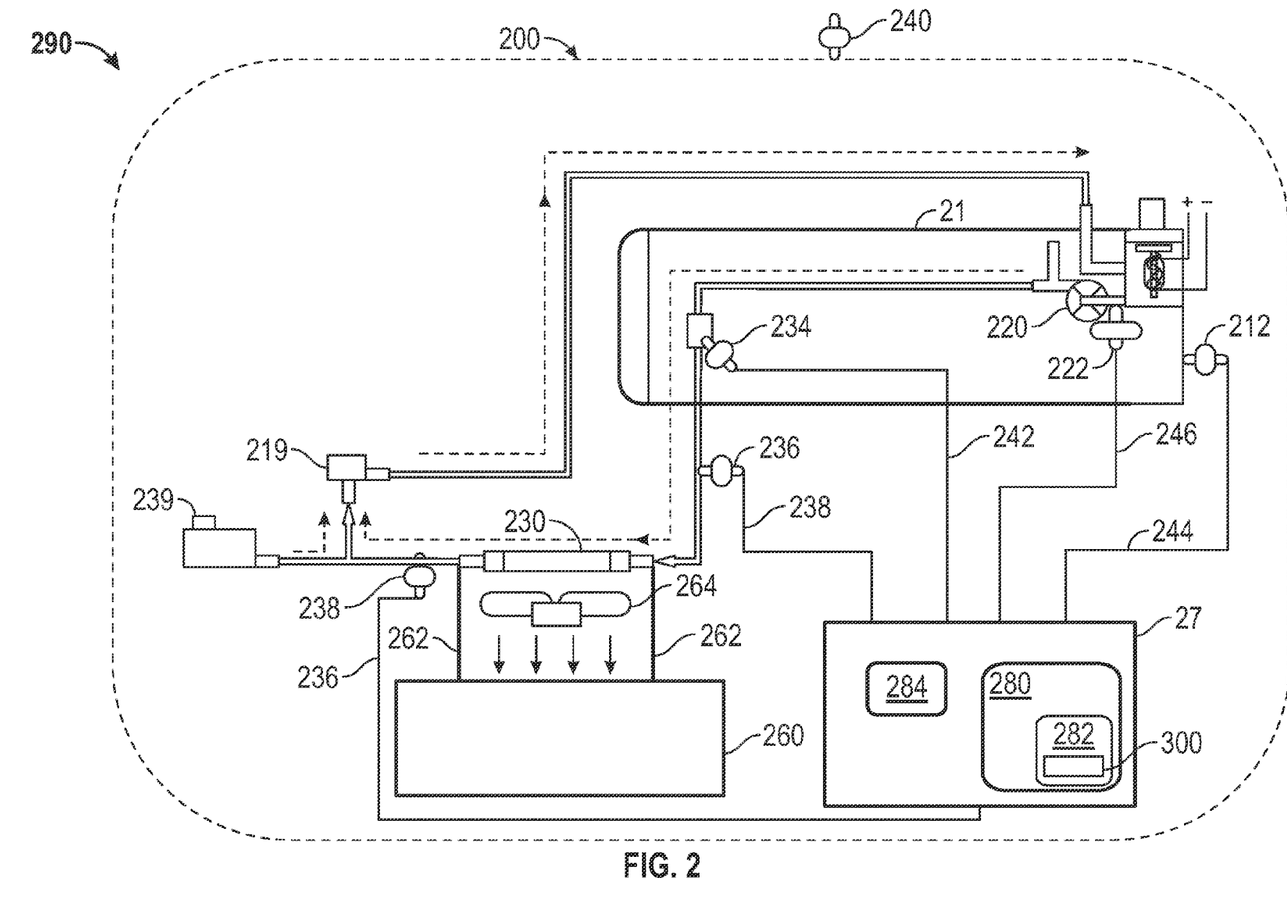
FIG. 2 is a block diagram that illustrates some of the components that can be implemented in conjunction with a hybrid electric vehicle of FIG. 1 in accordance with the disclosed embodiments.

FIG. 2 is a block diagram that illustrates some of the components 200 that can be implemented in conjunction with a hybrid electric vehicle 10 of FIG. 1 in accordance with the disclosed embodiments.

The components 200 can be used to implement a climate control system (or a portion thereof that is used in control of the climate control system). The climate control system is used to control how "conditioned air" is provided to a cabin compartment 260 in the HEV 10. To explain further, the HEV 10 of FIG. 1 includes one or more air ducts 262, as illustrated in FIG. 2. The air ducts 262 channel the conditioned air into the cabin compartment 260 through air vents (not shown) opening into the cabin compartment 260. "Conditioned air" refers to cooled air, heated air, or both cooled and heated air depending on the operation of the climate control system. The climate control system may include a heating ventilating and air conditioning (HVAC) system to selectively provide the cooled and/or heated air to the cabin compartment 260.

When heating the cabin compartment 260, the ICE 21 may heat a coolant that is channeled through a heater core 239, while the climate control system forces air across the heater core 239 to transmit the heated air to the cabin compartment 260. Transmitting heated air to the cabin compartment 260 increases the temperature of air in the cabin compartment 260 and, therefore can increase passenger comfort in the HEV 10 when operating in cold ambient temperature conditions.

In the particular implementation that is illustrated in FIG. 2, the components 200 include the internal combustion engine 21, an auxiliary engine coolant pump 219 for pumping engine coolant fluid, a primary engine coolant pump 220 for pumping engine coolant fluid, a heater core 230, an engine coolant reservoir 239, a vent 262 that includes a blower fan 264 for moving heater air from the heater core 230 into a cabin 260, a controller unit 27 and various sensors. In one non-limiting implementation of the disclosed embodiments, the sensors can include any known speed sensors and any known temperature sensors.

The speed sensors can include, for example, a speed sensor 212 for sensing an indication of speed of the internal combustion engine 21, and a speed sensor 222 for sensing an indication of speed of the pump 220.

The temperature sensors can include, for example, a temperature sensor 234 for sensing an indication of engine coolant temperature (either directly or indirectly), a temperature sensor 236 for sensing an indication of input temperature to the heater core 230 (e.g., a sensor that obtains either directly or indirectly an indication of the input temperature of coolant passing into the heater core 239), a temperature sensor 238 for sensing an indication output temperature from the heater core 230 (e.g., a sensor that obtains either directly or indirectly an indication of the input temperature of coolant passing into the heater core 239), and a temperature sensor 240 for sensing outside air temperature (e.g., a sensor that obtains, either directly or indirectly, an indication of air temperature outside 290 the HEV 10).

The engine coolant reservoir 239 holds the engine coolant. The primary engine coolant pump 220 is the primary pump that pumps the engine coolant through the vehicle. The heater core 230 is a radiator-like device used in heating the cabin 260 of the vehicle 10. Hot coolant from the ICE 21 is passed through a winding tube of the heater core 230, a heat exchanger between coolant and cabin air. Fins attached to the core tubes serve to increase surface for heat transfer to air that is forced past them, by a blower fan 264, thereby heating the cabin 260.

As illustrated in FIG. 2, the HEV 10 includes a controller 27 or some other type of programmable logic device to control various components in the HEV 10, such as the transmission lubrication system and the climate control module (not illustrated in FIG. 2). Although the controller 27 is shown as a single hardware device, the controller may include multiple controllers in the form of multiple hardware devices, or multiple software controllers within one or more hardware devices.

As shown in FIG. 2, the controller 27 may include a computer-readable storage medium or memory 280 (hereinafter "memory"). The memory 280 can be implemented using one or more of RAM memory, flash memory, ROM memory, EPROM memory, EEPROM memory, registers, a hard disk, a removable disk, a CD-ROM, or any other form of storage medium known in the art.

The memory 280 stores various data or information, such as the software instructions 282 in which a computer program or algorithm may be embedded or encoded on. The software instructions 282 can include a set of instructions 300 (or module) that will be described below. In addition to storing the software instructions 282, the memory 280 can store data or information about the various operating conditions or components in the HEV 10. For example, the memory 280 may store predetermined temperatures (such as coolant temperatures), run times, levels of power, levels of speed, etc. or any combinations thereof.

In some implementations, the memory 280 can be part of the controller 27 as shown in FIG. 2. However, in other implementations, the memory 280 may be positioned in any suitable portion or portions in the HEV 10 accessible by the controller 27.

As shown in FIG. 2, in some implementations, the controller 27 includes a processor 284. The processor 284 can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The processor 284 may also be implemented as a combination of computing devices, e.g., a combination of a DSP and a microprocessor, a plurality of microprocessors, one or more microprocessors in conjunction with a DSP core, or any other such configuration.

The processor 284 operates to execute a set of the software instructions 282, as part of a computer program and/or the algorithm that is stored within the memory 280, and that receives inputs from various hardware and/or software modules that are implemented within the vehicle. In accordance with one implementation of the disclosed embodiments, the software instructions 282 can include, for example, software instructions can include a set of software instructions designed to: determine a value of a first fluid flow rate that corresponds to an engine coolant fluid temperature and an engine speed input value; determine a value of a second fluid flow rate that corresponds to the engine coolant fluid temperature and a pump speed input value; generate, based on at least one value of the first fluid flow rate and the second fluid flow rate, a value of fluid flow rate of engine coolant fluid through the heater core; generate, based on the engine coolant fluid temperature, a value of fluid viscosity of the engine coolant fluid; compute a temperature difference between an output temperature of the heater core and an input temperature of the heater core; generate, based on the value of fluid flow rate through the heater core, the value of fluid viscosity, and the temperature difference, a calculated thermal power loss across a heater core; and generate, based on the calculated thermal power loss and an ambient air temperature, an offset value for modifying the first curve for ECT warm-up trajectory to produce the desired curve for ECT warm-up trajectory that is offset from the first curve.

Although not shown in FIG. 2, it will be appreciated that the HEV 10 can include a communications bus or vehicle communications bus (not illustrated) that is in communication with various components of the HEV 10 including the controller 27. In FIG. 2, the communications bus is represented via individual connecting lines that are shown as separate links; however, these separate links may also involve communications over the communications bus in some embodiments. The controller 27 is configured to communicate with various components, modules and sensors via a communications bus that may be implemented as a controller area network (CAN), a local interconnect network (LIN), or any such suitable data-communication link that can transfer data between the controller 27 and other devices in the HEV 10.

As shown in FIG. 2, the HEV 10 may include one or more sensors 212, 222, 234, 236, 238, 240. Some of the basic functions of the sensors 212, 222, 234, 236, 238, 240 are described above.

As illustrated in FIG. 2 and described above, these sensors can be disposed within the HEV 10 (e.g., at or near the ICE 21 to sense various parameters of the ICE 21 and to transmit the parameters detected or measured from the ICE 21, and other portions that are coupled to the ICE 21, to the controller 27 via direct connections or via indirect communicatively couples connections through a communications bus (not illustrated)).

The controller 27 may receive and process signals from the sensor(s) 212, 222, 234, 236, 238, 240, and the drive shaft(s) 32 through the communications bus, as well as signals from various other controllers or components that are not illustrated such as the climate control module, etc. that are described above.

The various sensors that are illustrated in FIG. 2, and how the various inputs to and outputs from those sensors are utilized and processed by the controller unit 27 to determine/select the appropriate engine coolant temperature warm-up trajectory will now be described below.

Figure 3:
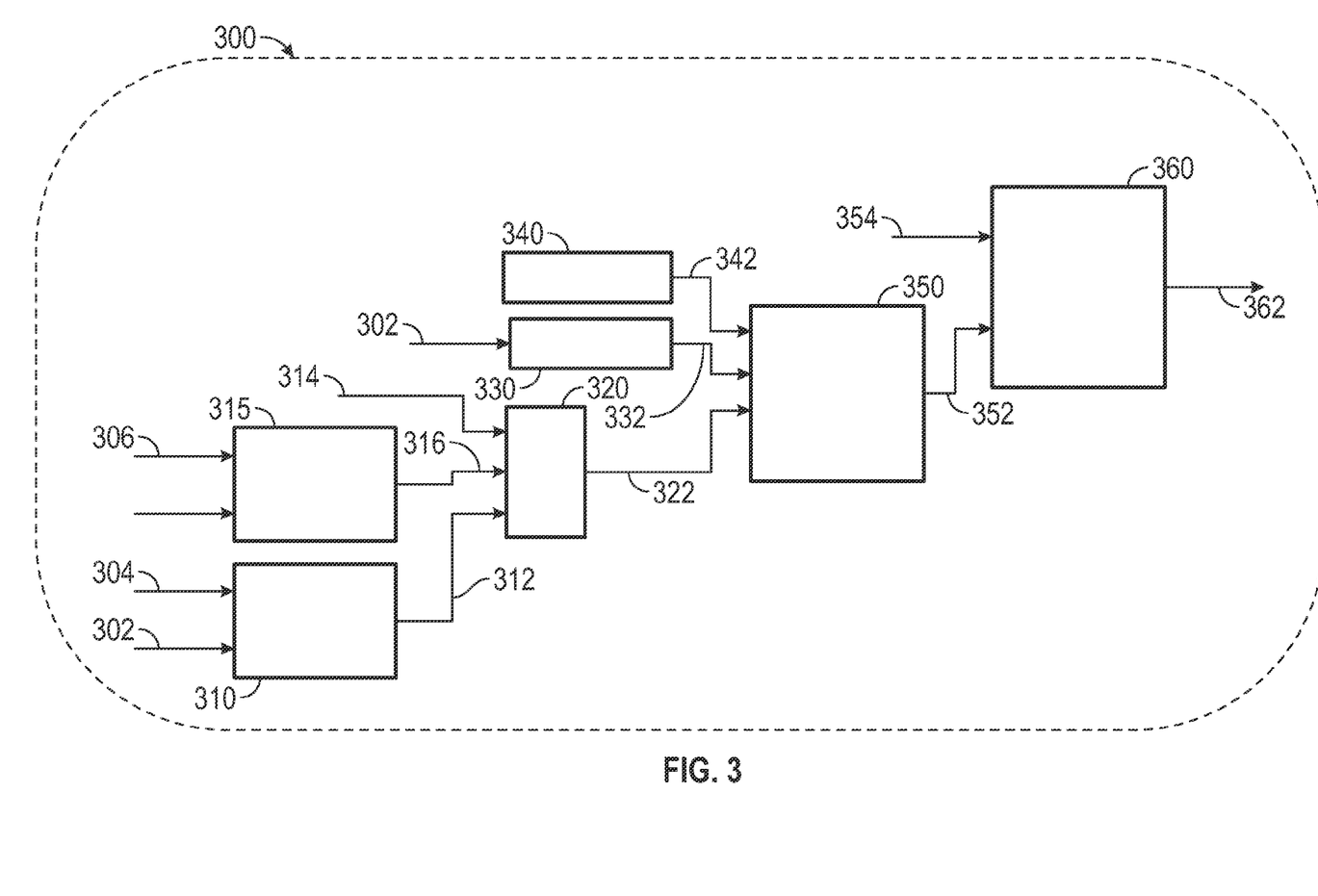
FIG. 3 is a block diagram of a computation module in accordance with some of the disclosed embodiments.

FIG. 3 is a block diagram of a computation module 240 in accordance with some of the disclosed embodiments. FIG. 3 will be described below with reference to FIG. 2.

The computation module 240 includes a first fluid flow calibration table 310, a second fluid flow calibration table 315, a fluid flow rate generator module 320, a viscosity calibration module 330, a temperature difference computation module 340, a thermal power loss computation module 350, and an offset lookup table 360.

Preliminarily, its noted that in the following description, the term "fluid" can refer to engine coolant, and that the terms fluid, engine coolant and engine coolant fluid are used interchangeably herein. In some implementations, the fluid is a mixture of water and ethylene glycol. The term "fluid flow rate" refers to the rate at which fluid (engine coolant) is flowing through the heater core 230. The fluid flow rate changes depending on whether or not the engine is on or off. If the engine 210 is off, the fluid flow rate is largely dependent on the speed of the pump 220, but when the engine 210 is on, the fluid flow rate is also dependent on the engine speed (since the pump 220 is connected to the engine 210).

The first fluid flow calibration table 310 is configured to receive an engine coolant temperature input value 302 and an engine speed input value 304. The first fluid flow calibration table 310 is configured to generate, based on the engine coolant temperature input value 302 and the engine speed input value 304, a first fluid flow rate 312 by determining the value of the first fluid flow rate 312 that corresponds to the engine coolant temperature input value 302 and the engine speed input value 304. In one implementation, the first fluid flow calibration table 310 can be implemented as a lookup table that outputs the fluid flow based on at least one of the engine coolant temperature input value 302 and the engine speed input value 304.

The second fluid flow calibration table 315 is configured to receive the engine coolant temperature input value 302 and a pump speed input value 306, and to generate, based on the engine coolant temperature input value 302 and the pump speed input value 306, a second fluid flow rate 316 by determining the value of the second fluid flow rate 316 that corresponds to the engine coolant temperature input value 302 and the pump speed input value 306. In one implementation, the second fluid flow calibration table 315 can be implemented as a lookup table that outputs the fluid flow based on at least one of the engine coolant temperature input value 302 and the pump speed input value 306.

The fluid flow rate generator module 320 is coupled to the first fluid flow calibration table 310 and the second fluid flow calibration table 315, and configured to receive the first fluid flow rate 312, an auto-stop command 314, and the second fluid flow calibration table 315. The auto-stop command 314 can be set to TRUE when the ICE 21 is off, and can be set to FALSE when the ICE 21 is on. The fluid flow rate generator module 320 is configured to generate, based on either the first fluid flow rate 312 or the second fluid flow rate 316, and a value of fluid flow rate ($\dot{m}$) 322 through the heater core 230.

To explain further, when the engine is on, the value of fluid flow rate ($\dot{m}$) 322 through the heater core 230 is computed based on the first fluid flow rate 312. By contrast, when the engine is off, the value of fluid flow rate ($\dot{m}$) 322 through the heater core 230 will be equal to the second fluid flow rate 316.

The viscosity calibration module 330 is coupled to the fluid flow rate generator module 320, and configured to receive the engine coolant temperature input value 302. The viscosity calibration module 330 is configured to generate, based on the engine coolant temperature input value 302, a value of fluid viscosity (Cp) 332 by computing dynamic fluid viscosity (Cp) of the engine coolant fluid based on the engine coolant temperature input value 302. In one implementation, the viscosity calibration module 330 can be a lookup table corresponds to a particular type of engine coolant fluid. The lookup table can output a particular value of fluid viscosity (Cp) 332 that corresponds to a particular engine coolant temperature input value 302. Those skilled in the art will appreciate that because different fluids have different viscosities as a function of temperature, the particular lookup table that is used will depend on the type of engine coolant fluid.

The temperature difference computation module 340 is configured to determine a difference temperature difference ($\Delta T$) 342 between an output temperature (Tout) 236 of the heater core 230 and an input temperature (Tin) 238 of the heater core 230 by subtracting the input temperature (Tin) 238 of the heater core 230 from the output temperature (Tout) 236 of the heater core 230.

The thermal power loss computation module 350 is coupled to the fluid flow rate generator module 320, the viscosity calibration module 330, and the temperature difference computation module 340. The thermal power loss computation module 350 can be configured to receive the value of fluid flow rate ($\dot{m}$) 322 through the heater core 230, the value of fluid viscosity (Cp) 332 and the temperature difference ($\Delta T$) 342. The thermal power loss computation module 350 is configured to generate, based on the value of fluid flow rate ($\dot{m}$) 322 through the heater core 230, the value of fluid viscosity (Cp) 332 and the temperature difference ($\Delta T$) 342, a calculated thermal power loss (Pth) 352. The calculated thermal power loss (Pth) 352 represents heat rejection through the heater core 230. In one embodiment, the calculated thermal power loss (Pth) 352 can be calculated based on the value of fluid flow rate ($\dot{m}$) 322 through the heater core 230, the value of fluid viscosity (Cp) 332, and the temperature difference ($\Delta T$) 342.

The offset lookup table 360 can receive the calculated thermal power loss (Pth) 352 and the ambient air temperature 354. The offset lookup table 360 is configured to generate an offset value 362 based on the calculated thermal power loss (Pth) 352 and the ambient air temperature 354. The offset value 362 is used for modifying a "first" curve for ECT warm-up trajectory (e.g., that is associated with highest heater core load) to generate an appropriate desired curve for ECT warm-up trajectory that is offset from the first curve (e.g., that is associated with one of a plurality of different lower heater core loads that is less than the highest heater core load). In one embodiment, this can be done by implementing a lookup table that is configured to determine an appropriate value of the offset value 362 for modifying/offsetting the first curve of ECT warm-up trajectory to produce an appropriate desired curve for ECT warm-up trajectory that is offset from the first curve. Each time an offset value is computed, the value of the first curve for ECT warm-up trajectory (e.g., that is associated with highest heater core load) is modified by the offset value to modify the first curve.

As will be explained below with reference to FIGS. 4A and 4B, the first curve is used under high load conditions, and an appropriate desired curve is generated and used when operating under lower loading conditions.

Figure 4A:
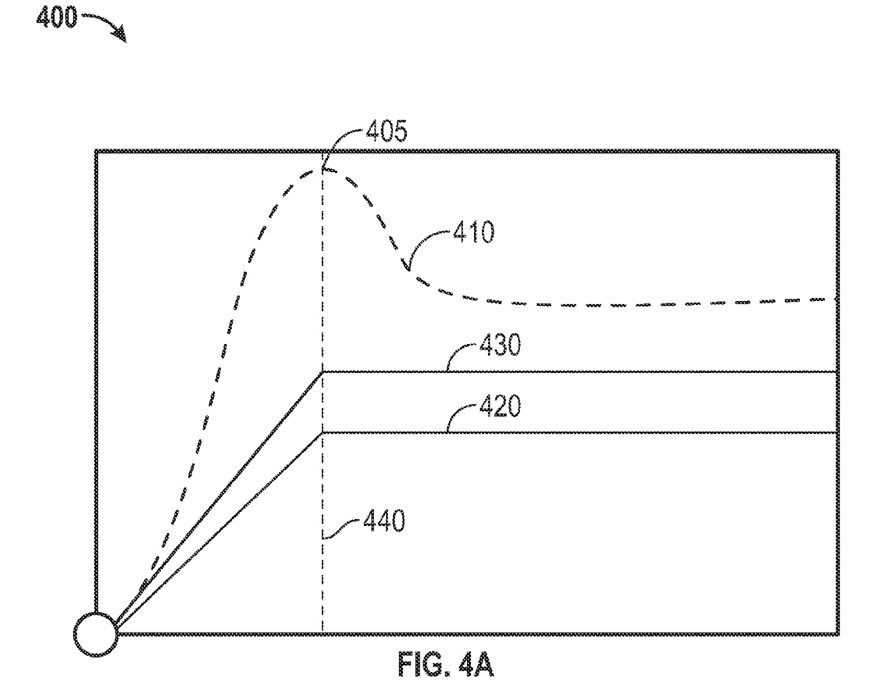
FIG. 4A is a graph that illustrates a conventional curve for ECT warm-up trajectory at a particular ambient temperature, a curve that corresponds to a lower cabin discharge temperature, and a curve that corresponds to a maximum cabin discharge temperature.

FIG. 4A is a graph 400 that illustrates a conventional curve 410 for ECT warm-up trajectory at a particular ambient temperature, a curve 420 that corresponds to a lower cabin discharge temperature, and a curve 430 that corresponds to a maximum cabin discharge temperature. In accordance with a conventional approach, the conventional curve 410 for ECT warm-up trajectory is selected based on a particular ECT, a particular ambient temperature, vehicle soak time and vehicle run time. In other words the curve 410 for ECT warm-up trajectory does not change based on any variable other than the ECT, ambient temperature and run-time. For instance, when the ambient temperature and/or ECT changes, the conventional curve 410 for ECT warm-up trajectory changes. As illustrated, the conventional curve 410 for ECT warm-up trajectory (at a particular ambient temperature and a particular ECT) is the same regardless of the cabin discharge temperature. In other words, the conventional curve 410 for ECT warm-up trajectory only varies (or is adjusted) based on the particular ambient temperature. At the particular ambient temperature, the conventional curve 410 for ECT warm-up trajectory rises rapidly until a maximum 405 is reached (at line 440 after is peak temperature is achieved for engine warm-up) and then eventually settles to a value.

Because the conventional curve 410 corresponds to a single ECT warm-up trajectory, this results in overachieving for discharge temperatures during low heater core load cases (e.g., such as low blower). One drawback of this approach is that the conventional curve 410 for ECT warm-up trajectory is determined based on a particular ambient temperature (or by interpolation based on a range of ambient temperatures). The conventional curve 410 is set largely based on worst case conditions. In other words, when the conventional curve 410 is calibrated on an actual vehicle, it must achieve a given target at maximum blower speed. Therefore, the ECT is required to meet that warm-up target regardless of blower speed.

In many scenarios, the engine 21 remains on to achieve the ECT target and fuel is unnecessarily burned. It would be desirable to provide a system that has the ability to lower the conventional curve 410 for ECT warm-up trajectory so that less fuel is burned.

Figure 4B:
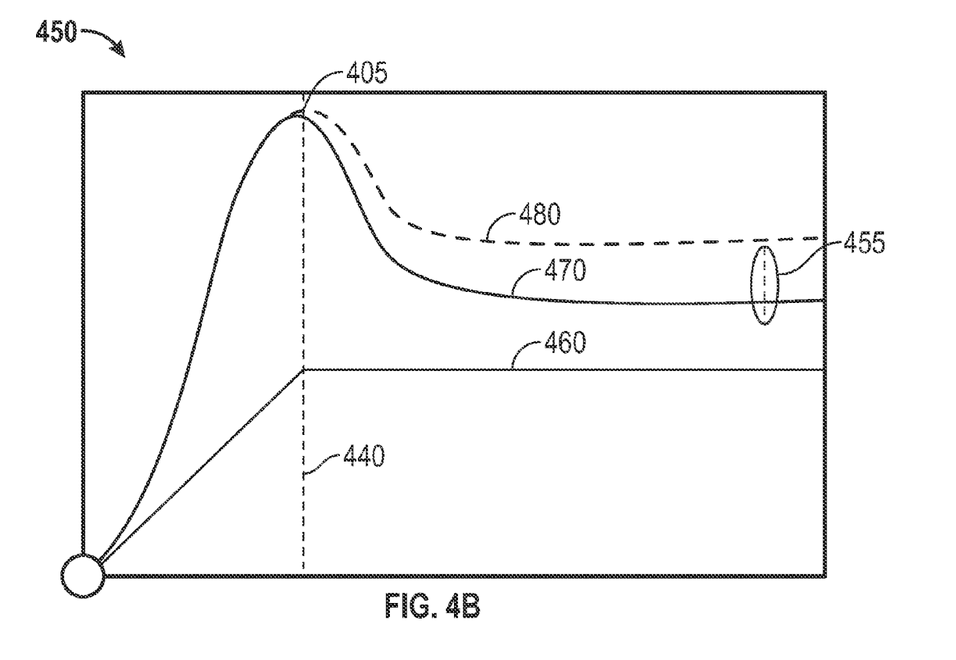
FIG. 4B is a graph that illustrates a first curve for ECT warm-up trajectory, a curve that corresponds to a particular cabin discharge temperature, and a desired curve for ECT warm-up trajectory that is offset from the first curve and that corresponds to the particular desired cabin discharge temperature in accordance with the disclosed embodiments.

FIG. 4B is a graph 450 that illustrates a first curve 455 for ECT warm-up trajectory, a curve 460 that corresponds to a particular cabin discharge temperature, and a desired curve 470 for ECT warm-up trajectory that is offset from the first curve 455 by a particular offset value in accordance with the disclosed embodiments.

The first curve 455 for ECT warm-up trajectory can be a maximum ECT warm-up trajectory. In one implementation, the maximum ECT warm-up trajectory can be associated with a highest heater core load and is used when the heater core is operating under a maximum load condition as determined based on calculated thermal power loss (Pth) 352 across the heater core 230. For example, in one implementation, when the demand for heat is determined to be high based on calculated thermal power loss (Pth) 352 across the heater core 230, the minimum allowable ECT can be increased, and the ECT warm-up trajectory can be increased or set to follow a first curve 455 that corresponds to a maximum ECT warm-up trajectory.

The desired curve 470 for ECT warm-up trajectory is offset from the first curve 455 such that it is adjusted to correspond to a particular heater core load. The first curve 455 and the desired curve 470 both have the same warm-up trajectory until the maximum 405 is reached (at line 440 after is peak temperature is achieved for engine warm-up); however, they eventually settle to different values since at least one value of the desired curve 470 for ECT warm-up trajectory is adjusted by an offset value (in comparison to the first curve 455) based on feedback regarding the heater core load on the system. To explain further, each time an offset value is computed, the value of the first curve 455 for ECT warm-up trajectory (e.g., that is associated with highest heater core load) is modified by that offset value to modify the first curve 455. In this example, a single offset value is computed such that the first curve 455 can follow the desired curve 470 that is illustrated. However, it is noted that as multiple offset values are computed at different times, the first curve 455 would be modified by each of those different offset values each time an offset value is computed such that the offset amount (by which the desired curve 470 is offset from the first curve 455) would vary. As such, while FIG. 4B represents a snapshot of how the first curve 455 would be modified during one computation of a particular offset value, those skilled in the art will appreciate that the first curve 455 will be modified by a new offset amount each time a new offset value is computed.

FIG. 4B illustrates that when the demand for heat is determined to be low (e.g., low blower) based on calculated thermal power loss (Pth) 352 across the heater core 230, the minimum allowable ECT can be reduced, and the ECT warm-up trajectory 470 can also be reduced (e.g., set to follow a desired curve that is offset from the first curve 455 such that it is less than the first curve 455 for maximum ECT warm-up trajectory). By reducing the ECT warm-up trajectory in low load cases after a peak temperature is achieved for engine warm-up, less fuel burned yet still meeting desired cabin warm-up performance. In other words, this results in achieving desired discharge temperatures during a low heater core load situation (such as low blower), and also allows for the engine to be turned off, which means that less fuel will be burned in comparison to the conventional approach.

To explain further, the offset value 362 generated by the offset lookup table 360 can have a plurality of different values.

At any particular ambient temperature (or range of particular ambient temperatures), the value of the desired curve 470 for ECT warm-up trajectory is offset from the first curve 455 by a particular offset value 362. Again, the offset value 362 corresponds to a particular value of the calculated thermal power loss (Pth) 352 across the heater core 230 and will have a value that is offset/reduced in comparison to the first curve 455.

To explain further, each particular value of the offset value 362 is associated with a particular desired curve 470 for ECT warm-up trajectory that is offset from the first curve 455 (i.e., that is reduced in comparison to the first curve). The particular desired curve 470 for ECT warm-up trajectory (that corresponds to the offset value 362 output by the offset lookup table 360) is offset from the first curve 455 by an offset value, where the offset value corresponds to a particular value of the ambient air temperature 354 and a particular value of the calculated thermal power loss (Pth) 352. Examples of various offset values are represented in FIG. 4B by the series of dots within oval 455, where each dot corresponds to a different one of the offset values. Each of the offset values are associated with a particular one of a plurality of different lower heater core loads, each of which are less than the highest heater core load. The desired curve (that is adjusted by a particular offset value) is used when the heater core 230 is operating under lower loading conditions (e.g., that are determined to be less than the maximum load condition based on the particular value of the calculated thermal power loss (Pth) 352 across the heater core 230).

Each particular offset value 362 corresponds to a particular ambient air temperature 354 and a particular value of the calculated thermal power loss (Pth) 352. As such, when heater core 230 demand is determined to be lower in low heater core loading situations, the desired curve 470 that the ECT warm-up trajectory follows can be reduced (e.g., after a "peak" temperature is achieved for engine warm-up). This can increase the time the ICE 21 remains in its off state, which can reduce fuel consumption while maintaining desired cabin heating performance.

Figure 5:
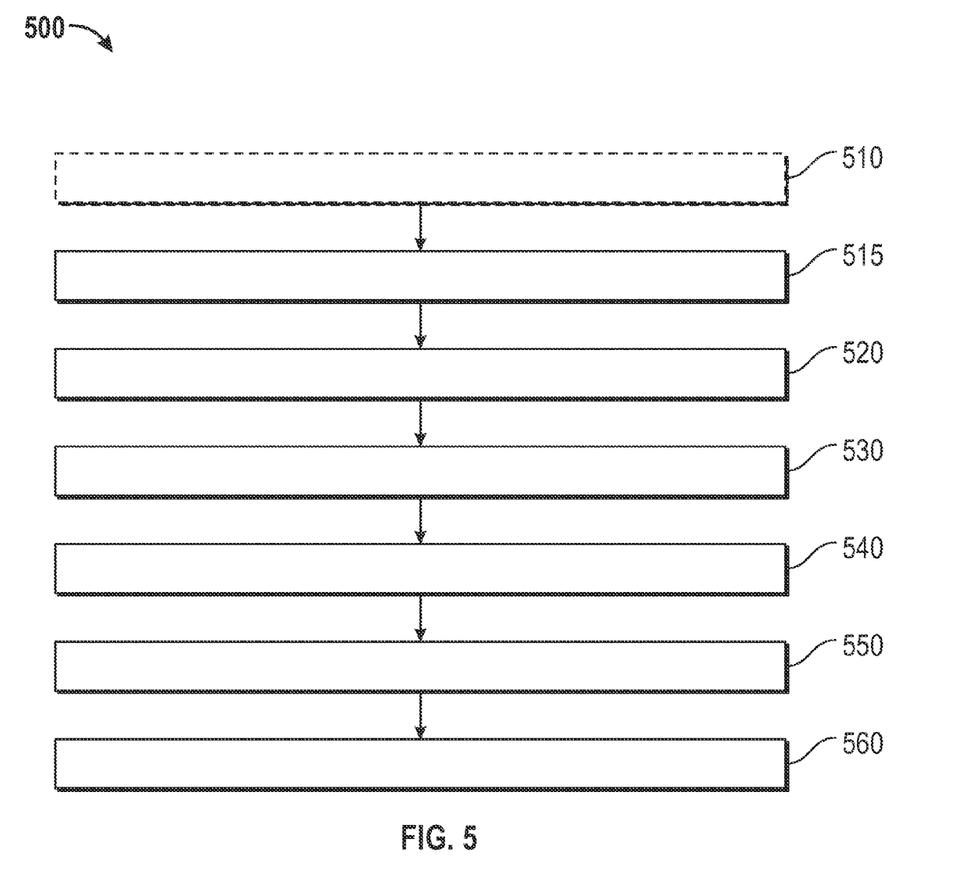
FIG. 5 is a block diagram of a method for computing an offset value for modifying a first curve for ECT warm-up trajectory to produce a desired curve for ECT warm-up trajectory that is offset from the first curve in accordance with some of the disclosed embodiments.

FIG. 5 is a block diagram of a method 500 for computing an offset value for modifying a first curve for ECT warm-up trajectory to produce a desired curve for ECT warm-up trajectory in accordance with some of the disclosed embodiments. The method 500 will be described below with reference to FIG. 3.

Step 510 is optional and is performed only when the engine is on. If the engine is not on, the step 510 need not be performed, and the value of the first fluid flow rate 312 is not determined. At 510, when the engine is on, the first fluid flow calibration table 310 can generate, based on the engine coolant temperature input value 242 and the engine speed input value 244, a value of a first fluid flow rate 312 that corresponds to the particular engine coolant temperature input value 242 and the particular engine speed input value 244. At 515, the second fluid flow calibration table 315 can generate, based on the engine coolant temperature input value 242 and the pump speed input value 246, the second fluid flow rate 316 by determining the value of the second fluid flow rate 316 that corresponds to the engine coolant temperature input value 242 and the pump speed input value 246.

At 520, the fluid flow rate generator module 320 can generate, based on at least one of the first fluid flow rate 312 and the second fluid flow rate 316, the value of fluid flow rate ($\dot{m}$) 322 through the heater core 230. To explain further, when the engine is on, the value of fluid flow rate ($\dot{m}$) 322 through the heater core 230 is computed based on the first fluid flow rate 312. By contrast, when the engine is off, the value of fluid flow rate ($\dot{m}$) 322 through the heater core 230 will be equal to the second fluid flow rate 316.

At 530, the viscosity calibration module 330 can generate or compute, based on the engine coolant temperature input value 242, the value of fluid viscosity (Cp) 332.

At 540, the temperature difference computation module 340 can determine a temperature difference ($\Delta T$) 342 between the output temperature (Tout) 236 of the heater core 230 and the input temperature (Tin) 238 of the heater core 230 by subtracting the input temperature (Tin) 238 from the output temperature (Tout) 236.

At 550, the thermal power loss computation module 350 can generate (e.g., compute) a calculated thermal power loss (Pth) 352 based on the value of fluid flow rate ($\dot{m}$) 322 through the heater core 230, the value of fluid viscosity (Cp) 332, and the temperature difference ($\Delta T$) 342. The calculated thermal power loss (Pth) 352 that represents heat rejection through the heater core 230.

At 560, the offset lookup table 360 can generate an offset value 362 for modifying the first curve for ECT warm-up trajectory to produce the desired curve for ECT warm-up trajectory based on the calculated thermal power loss (Pth) 352 and the ambient air temperature 354. A particular value for the offset value 362 that corresponds to the calculated thermal power loss (Pth) 352 and the ambient air temperature 354 can be looked up in the offset lookup table 360.

The ECT warm-up trajectory is defined in relation to vehicle runtime and ambient air temperature (e.g., ambient air temperatures of 20° C., 10° C., 0° C., −10° C. and −20° C.). Interpolation schemes can be implemented to determine the desired curve for ECT warm-up trajectory for ambient air temperatures that lie between the ambient air temperatures of 20° C., 10° C., 0° C., −10° C. and −20° C.

A closed-loop control of the hybrid powertrain system is executed in response to the ECT warm-up trajectory. The ICE 21 is controlled such that the ECT follows the ECT warm-up trajectory. The closed-loop control includes directly monitoring various variables using the sensors. If the ECT warm-up trajectory is not following the desired curve, the ICE 21 is forced on and to run harder so that engine heat increases to track the ECT warm-up trajectory.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

As noted above, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the disclosed embodiments as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. In a hybrid-electric vehicle comprising a cabin, a system for modifying a first curve for engine coolant temperature (ECT) warm-up trajectory to produce a desired curve for ECT warm-up trajectory that is offset from the first curve, the system comprising:
    a processor configured to execute software instructions; and
    a memory configured to store software instructions accessible by the processor, wherein the software instructions comprise:
        an offset lookup table, configured to generate, based on a calculated thermal power loss (Pth) across a heater core and an ambient air temperature, an offset value for modifying the first curve for ECT warm-up trajectory to produce the desired curve for ECT warm-up trajectory that is offset from the first curve, wherein the desired curve for ECT warm up trajectory is used to adjust temperature in the cabin.

2. A system according to claim 1, wherein the software instructions further comprise:
    a thermal power loss computation module configured to compute the calculated thermal power loss (Pth) based on a value of fluid flow rate ($\dot{m}$) of engine coolant fluid through the heater core, a value of fluid viscosity (Cp) of the engine coolant fluid, and a temperature difference ($\Delta T$) between an output temperature (Tout) of the heater core and an input temperature (Tin) of the heater core.

3. A system according to claim 2, wherein the software instructions further comprise:
    a temperature difference computation module configured to determine the temperature difference ($\Delta T$) by subtracting the input temperature (Tin) of the heater core from the output temperature (Tout) of the heater core.

4. A system according to claim 3, wherein the software instructions further comprise:
    a viscosity calibration module configured to generate, based on an engine coolant fluid temperature input value, a value of fluid viscosity (Cp) of the engine coolant fluid.

5. A system according to claim 4, wherein the software instructions further comprise:
    a fluid flow rate generator module, configured to receive a first fluid flow rate, an auto-stop command, and a second fluid flow rate, and configured to generate, based on at least one of the first fluid flow rate and the second fluid flow rate, the value of the fluid flow rate ($\dot{m}$) of the engine coolant fluid through the heater core.

6. A system according to claim 5, when the auto-stop command is set to true, wherein the fluid flow rate generator module is configured to generate the value of the fluid flow rate ($\dot{m}$) of the engine coolant fluid through the heater core, based on the second fluid flow rate.

7. A system according to claim 5, when the auto-stop command is set to false, wherein the fluid flow rate generator module is configured to generate the value of the fluid flow rate ($\dot{m}$) of the engine coolant fluid through the heater core based on the first fluid flow rate.

8. A system according to claim 5, wherein the software instructions further comprise:
    a first fluid flow calibration table configured to determine, when the engine is on, based on an engine coolant fluid temperature and an engine speed input value, a value of the first fluid flow rate that corresponds to the engine coolant fluid temperature and the engine speed input value; and
    a second fluid flow calibration table configured to determine, based on the engine coolant fluid temperature and a pump speed input value, a value of a second fluid flow rate that corresponds to the engine coolant fluid temperature and the pump speed input value.

9. A non-transitory processor-readable storage medium having processor-readable code embodied thereon for programming at least one processor to perform a method for modifying a first curve for engine coolant temperature (ECT) warm-up trajectory, the method comprising:
    generating from an offset lookup table, based on a calculated thermal power loss (Pth) across a heater core and an ambient air temperature, an offset value for modifying the first curve for ECT warm-up trajectory to produce a desired curve for ECT warm-up trajectory that is offset from the first curve and that is used to adjust temperature in a cabin of a hybrid-electric vehicle.

10. A method according to claim 9, further comprising:
computing the calculated thermal power loss (Pth), based on a value of fluid flow rate ($\dot{m}$) of engine coolant fluid through the heater core, a value of fluid viscosity (Cp) of the engine coolant fluid, and a temperature difference ($\Delta$T) between an output temperature (Tout) of the heater core and an input temperature (Tin) of the heater core.

11. A method according to claim 10, further comprising:
determining the temperature difference ($\Delta$T) by subtracting the input temperature (Tin) of the heater core from the output temperature (Tout) of the heater core.

12. A method according to claim 11, further comprising:
computing, based on an engine coolant fluid temperature input value, the value of fluid viscosity (Cp) of the engine coolant fluid.

13. A method according to claim 12, further comprising:
generating the value of the fluid flow rate ($\dot{m}$) of the engine coolant fluid through the heater core based on values of one of a first fluid flow rate and a second fluid flow rate.

14. A method according to claim 13, when an auto-stop command is set to true, wherein the step of generating the value of the fluid flow rate ($\dot{m}$) of the engine coolant fluid through the heater core comprises:
generating the value of the fluid flow rate ($\dot{m}$) of the engine coolant fluid through the heater core based on the value of the second fluid flow rate.

15. A method according to claim 13, when an auto-stop command is set to false, wherein the step of generating the value of the fluid flow rate ($\dot{m}$) of the engine coolant fluid through the heater core comprises:
generating the value of the fluid flow rate ($\dot{m}$) of the engine coolant fluid through the heater core based on the value of the first fluid flow rate.

16. A method according to claim 13, further comprising:
when the engine is on, determining a value of the first fluid flow rate that corresponds to an engine coolant fluid temperature and an engine speed input value; and
determining a value of the second fluid flow rate that corresponds to the engine coolant fluid temperature and a pump speed input value.

17. In a hybrid-electric vehicle comprising a cabin, a system for modifying a first curve for engine coolant temperature (ECT) warm-up trajectory to produce a desired curve for ECT warm-up trajectory that is offset from the first curve, the system comprising:
a processor configured to execute software instructions; and
a memory configured to store software instructions accessible by the processor, the software instructions including a set of software instructions stored in the memory to:
determine a value of a first fluid flow rate that corresponds to an engine coolant fluid temperature and an engine speed input value;
determine a value of a second fluid flow rate that corresponds to the engine coolant fluid temperature and a pump speed input value;
generate, based on a value of either the first fluid flow rate or the second fluid flow rate, a value of fluid flow rate ($\dot{m}$) of engine coolant fluid through the heater core;
generate, based on the engine coolant fluid temperature, a value of fluid viscosity (Cp) of the engine coolant fluid;
compute a temperature difference ($\Delta$T) between an output temperature (Tout) of the heater core and an input temperature (Tin) of the heater core;
generate, based on the value of fluid flow rate ($\dot{m}$) through the heater core, the value of fluid viscosity (Cp), and the temperature difference ($\Delta$T), a calculated thermal power loss (Pth) across a heater core; and
generate, based on the calculated thermal power loss (Pth) and an ambient air temperature, an offset value for offsetting the first curve for ECT warm-up trajectory to produce the desired curve for ECT warm-up trajectory, wherein the desired curve for ECT warm up trajectory is used to adjust temperature in the cabin.

18. A system according to claim 17, wherein the offset value can have a plurality of different values, and wherein each particular value of the offset value is used to offset the first curve for ECT warm-up trajectory.

19. A system according to claim 17, wherein the first curve for ECT warm-up trajectory is:
a maximum ECT warm-up trajectory associated with a highest heater core load and is used when the heater core is operating under a maximum load condition as determined based on calculated thermal power loss (Pth) across the heater core.

20. A system according to claim 19, wherein the desired curve for ECT warm-up trajectory is offset by the offset value that corresponds to a particular value of the ambient air temperature and a particular value of the calculated thermal power loss (Pth), and wherein the desired curve for ECT warm-up trajectory is associated with a lower heater core load that is determined to be less than the highest heater core load when the heater core is operating under maximum loading conditions.

21. In a hybrid-electric vehicle, a system comprising:
a processor configured to execute software instructions; and
a memory configured to store software instructions accessible by the processor, wherein the software instructions comprise:
an offset lookup table configured to generate an offset value for modifying a first curve for engine coolant temperature (ECT) warm-up trajectory to produce a desired curve for ECT warm-up trajectory that is offset from the first curve.

22. A system according to claim 21, wherein the offset lookup table is configured to generate the offset based on at least one variable that provides feedback regarding heater core loading.

23. A system according to claim 22, wherein the at least one variable that provides feedback regarding heater core loading, comprises:
a calculated thermal power loss (Pth) across a heater core.

24. A system according to claim 23, wherein the at least one variable that provides feedback regarding heater core loading comprises more than one variable that provides feedback regarding heater core loading, wherein the variables that provide feedback regarding heater core loading further comprise:
an ambient air temperature.

25. A system according to claim 22, wherein the at least one variable that provides feedback regarding heater core loading, comprises:
heater core output temperature.

26. A non-transitory processor-readable storage medium having processor-readable code embodied thereon for programming at least one processor to perform a method for modifying a first curve for engine coolant temperature (ECT) warm-up trajectory, the method comprising:
   generating, from an offset lookup table, an offset value for modifying the first curve for ECT warm-up trajectory to produce a desired curve for ECT warm-up trajectory that is offset from the first curve.

27. A method according to claim 26, wherein the step of generating, comprises:
   generating, from an offset lookup table based on at least one variable that provides feedback regarding heater core loading, an offset value for modifying the first curve for ECT warm-up trajectory to produce a desired curve for ECT warm-up trajectory that is offset from the first curve.

28. A method according to claim 27, wherein the at least one variable that provides feedback regarding heater core loading, comprises:
   a calculated thermal power loss (Pth) across a heater core.

29. A method according to claim 28, wherein the at least one variable that provides feedback regarding heater core loading comprises more than one variable that provides feedback regarding heater core loading, wherein the variables that provide feedback regarding heater core loading further comprise:
   an ambient air temperature.

30. A method according to claim 27, wherein the at least one variable that provides feedback regarding heater core loading, comprises:
   heater core output temperature.

* * * * *